United States Patent [19]

Isham

[11] 3,912,942

[45] Oct. 14, 1975

[54] SIGNAL COMPARISON CIRCUITS

[75] Inventor: Robert Haynes Isham, Piscataway, N.J.

[73] Assignee: RCA Corporation, New York, N.Y.

[22] Filed: Feb. 4, 1974

[21] Appl. No.: 439,543

[52] U.S. Cl. .................. 307/232; 330/33; 307/251; 330/35

[51] Int. Cl.[2] .......................................... H03K 5/20

[58] Field of Search ...... 330/33; 307/232, 235, 252; 328/109, 137, 147

[56] References Cited

UNITED STATES PATENTS

| | | | |
|---|---|---|---|
| 3,461,300 | 8/1969 | Braun | 330/33 X |
| 3,504,201 | 3/1970 | Richardson | 307/232 X |
| 3,611,160 | 10/1971 | Beauviala | 307/232 X |

*Primary Examiner*—Nathan Kaufman
*Attorney, Agent, or Firm*—H. Christoffersen; S. Cohen

[57] ABSTRACT

Circuits for indicating the order in which two concurrent signals arrive and the period during which both signals are present. These circuits include two signal powered switches, such as transistors, each receptive of a different signal. When the first arriving signal is present it closes its switch and the closed switch keeps the other switch open. Circuits controlled by the respective switches produce output indications, each during the period a switch is both open and receiving the second arriving one of the signals.

17 Claims, 13 Drawing Figures

SIGNAL COMPARISON CIRCUITS

This invention relates to signal comparison circuits and particularly to signal powered signal comparison circuits wherein at least one of the signals to be compared with another is an electrical signal.

Numerous applications exist in signal processing, instrumentation and power control systems for a simplified signal comparison circuit for indicating the order in which two concurrent signals arrive and the period during which both signals are present. A particular need exists for such a circuit that is signal powered and has the capability of unambiguously determining the sequence of two input signals over a range of 2 $\pi$ radians. A further need exists, for example in zero voltage switching applications, for a signal comparison circuit that is responsive to an electrical input signal and an optical input signal for detecting zero crossings of the electrical signal during the period the optical input signal is applied. The present invention is directed to fulfilling these needs.

In accordance with the present invention, a sequence identifying circuit produces a unique output signal manifestation in response to energy supplied by a first applied one of at least two input signals, at least one of which is an electrical signal. Means in the sequence identifying circuit inhibits a change in the unique output signal manifestation for so long as the first applied input signal remains continuously applied. Further circuit means produces an output signal in response to the unique signal manifestation and energy supplied by the later applied one of the input signals.

The invention is illustrated in the accompanying drawings wherein like reference numerals designate like reference elements and in which.

Figure 1:
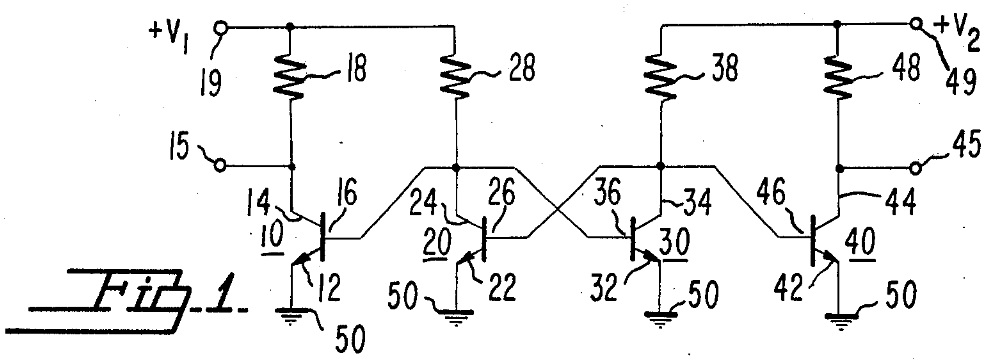
FIG. 1 is a circuit diagram embodying the invention wherein both input signals are electrical input signals and where bipolar transistors are employed as switching elements.
Figure 4A:
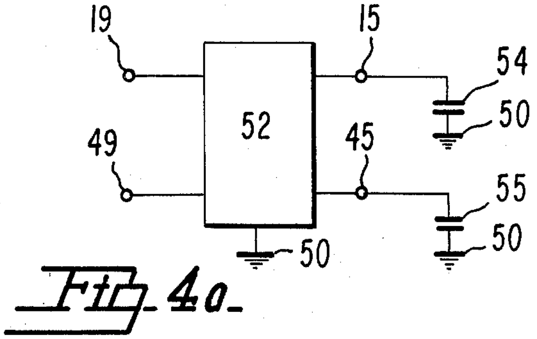
Figure 4B:
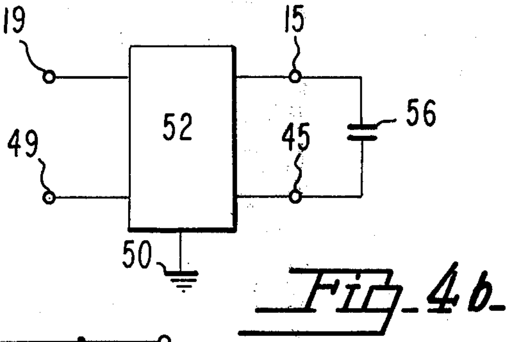
Figure 5:
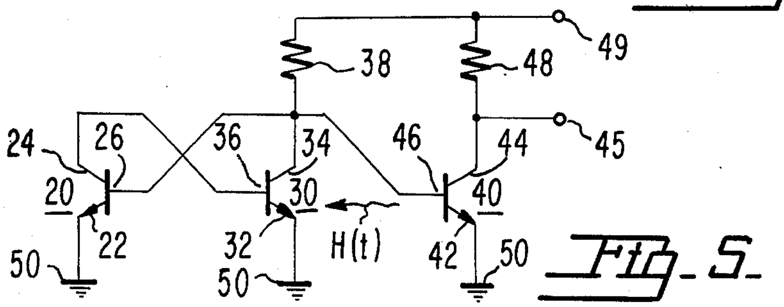
Figure 6:
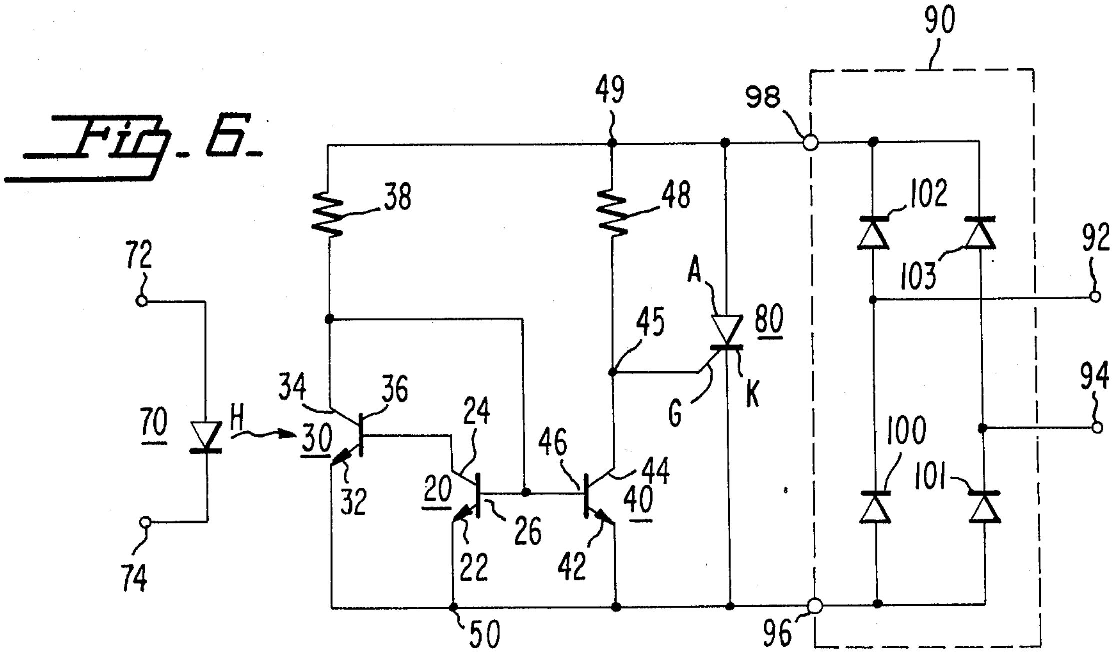
Figure 7:
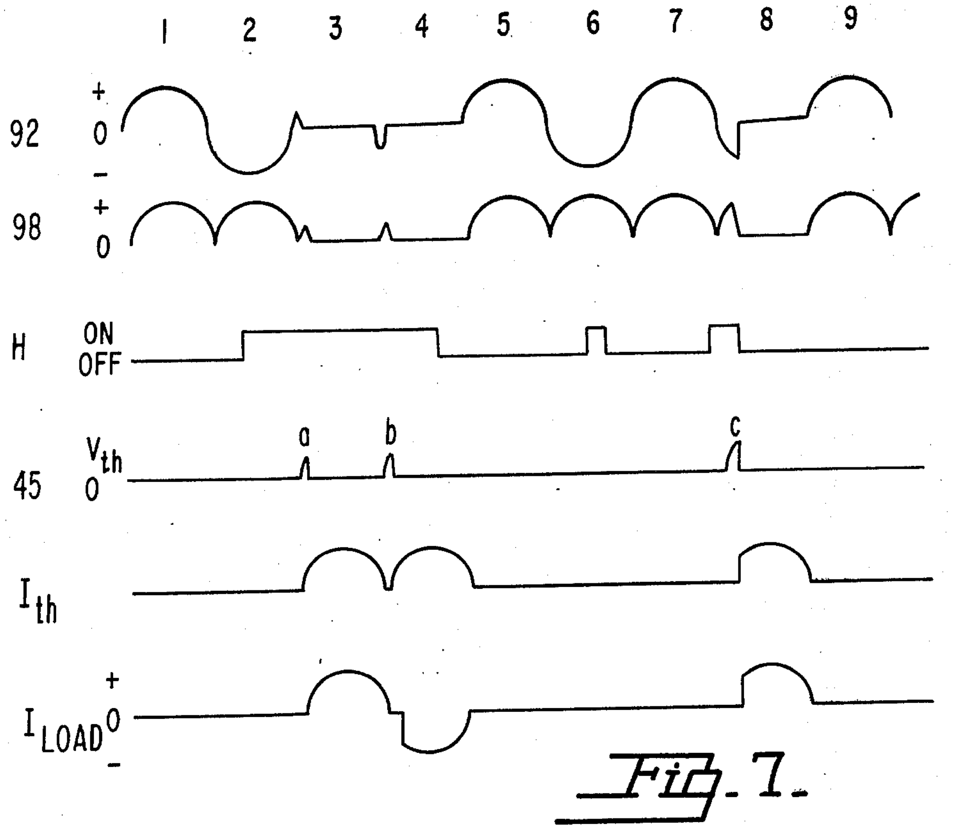
Figure 8:
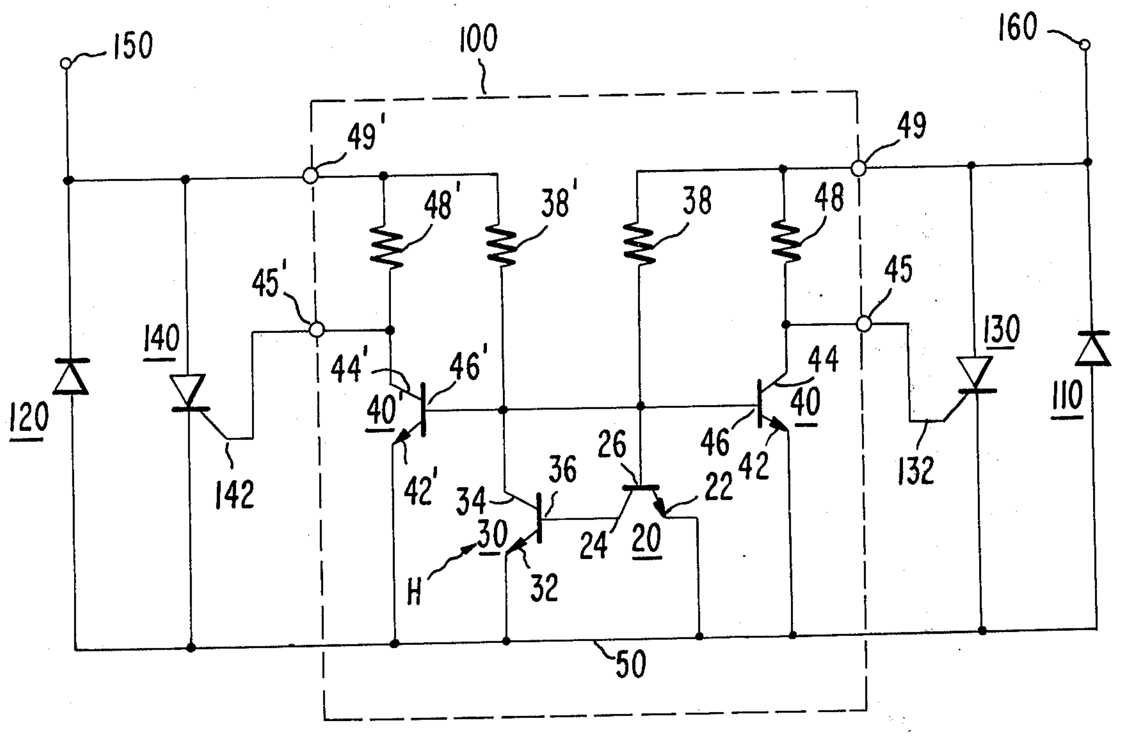
Figure 9:
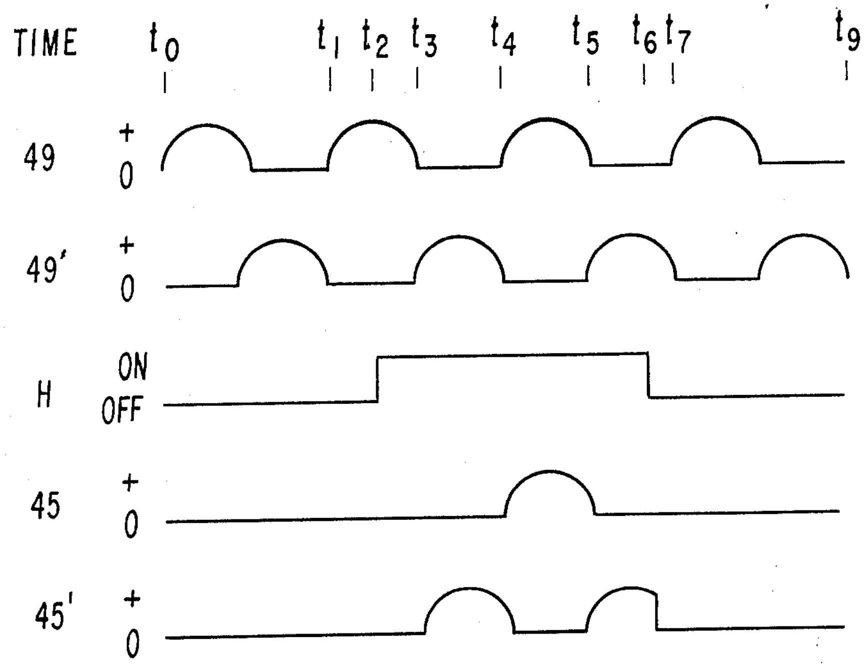
Figure 10:
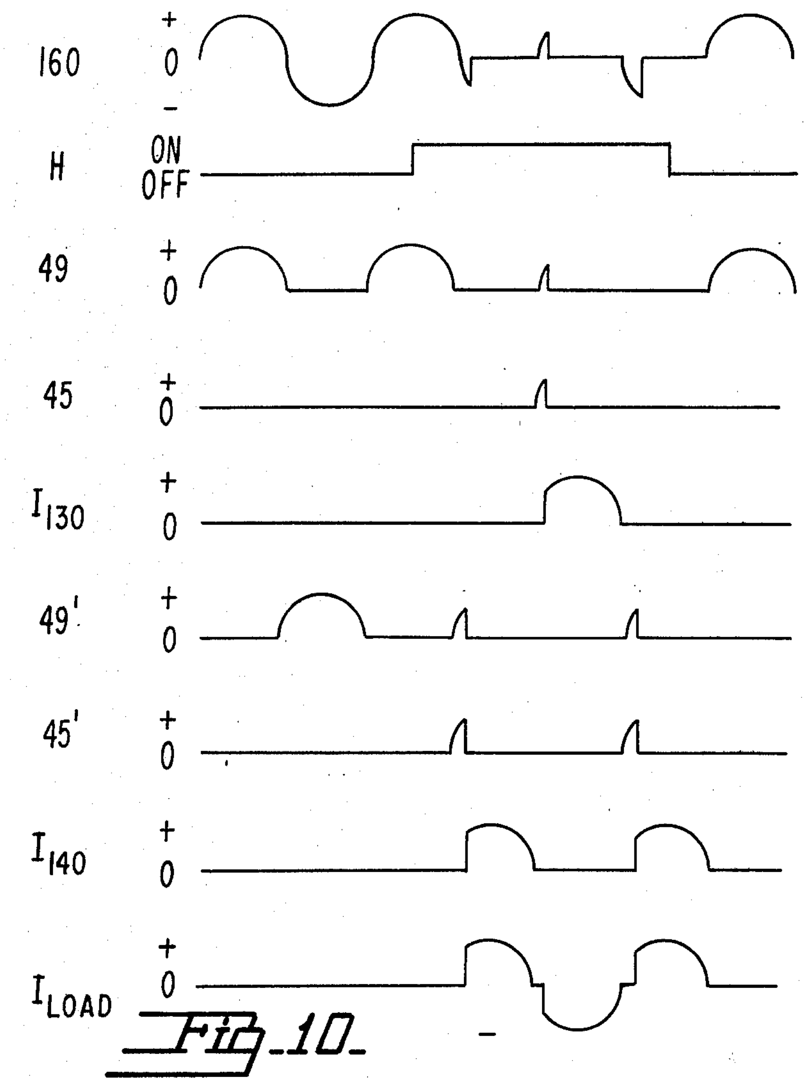

FIGS. 4*a* and 4*b* are simplified circuit diagrams illustrating phase measurement capabilities of the circuit of FIG. 1;

FIG. 5 is a circuit diagram embodying the invention wherein one input signal is in the form of radiation;

FIGS. 6 and 8 are circuit diagrams of zero voltage switching circuits embodying the invention;

FIG. 7 illustrates signal waveforms of the embodiment of FIG. 6;

FIGS. 9 and 10 illustrate signal waveforms of the embodiment of FIG. 8; and

Figure 11:
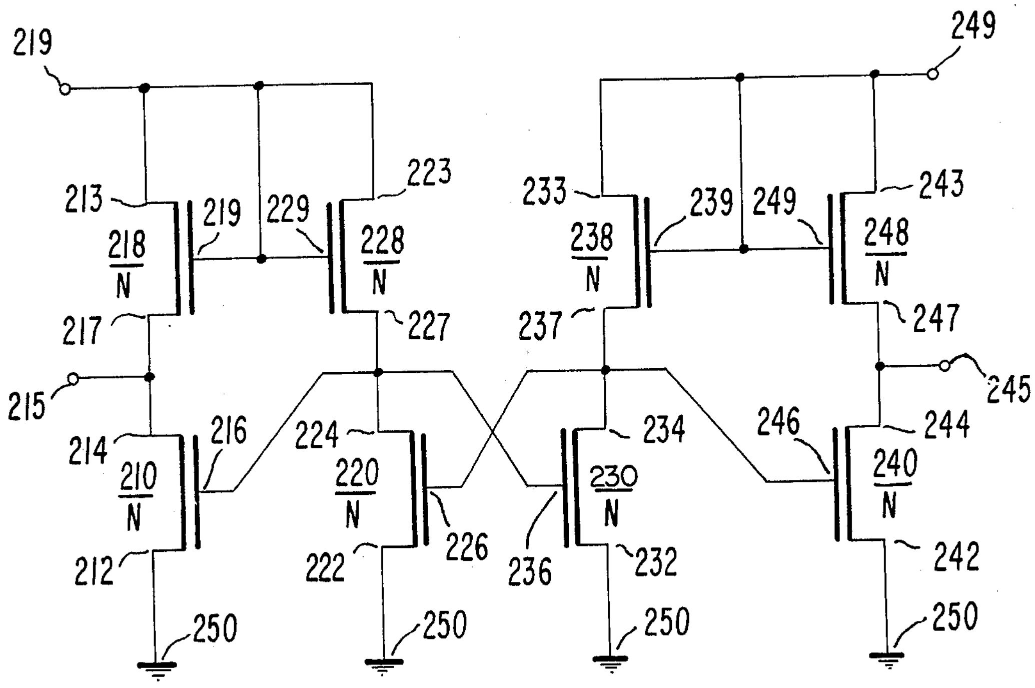

FIGS. 11 aand 12 are circuit diagrams of embodiments of the invention employing field-effect transistors.

In FIG. 1 transistors 10, 20, 30 and 40 are connected at their emitters 12, 22, 32, and 42, respectively, to ground reference point 50. Collector 14 of transistor 10 is connected to output terminal 15. Collector 24 of transistor 20 is connected to bases 16 and 36 of transistors 10 and 30, respectively. Collector 34 of transistor 30 is connected to bases 26 and 46 of transistors 20 and 40, respectively. Collector 44 of transistor 40 is connected to output terminal 45. Resistors 18 and 28 are connected between collectors 14 and 24, respectively and input terminal 19. Resistors 38 and 48 are connected between collectors 34 and 44, respectively, and input terminal 49.

In operation, transistors 20 and 30 function as a pair of normally open switches. For example, when the potential at input terminals 19 and 49 is at ground reference level, no base current is supplied to either transistor and their collector-to-emitter conduction paths are non-conductive. Resistor 28 serves to supply a turn-on current to the base of transistor 30 in response to a positive input signal $+V_1$ supplied to input terminal 19. Resistor 38 serves to supply a turn-on current to the base of transistor 20 in response to a positive input signal $+V_2$ supplied to input terminal 49. The connection from collector 24 of transistor 20 to base 36 of transistor 30 serves to inhibit turn-on of transistor 30 when transistor 20 is turned-on by shunting the transistor 30 base current to ground through the collector-to-emitter conduction path of transistor 20. Similarly, the connection from collector 34 of transistor 30 to base 26 of transistor 20 serves to inhibit turn-on of transistor 20 when transistor 30 is turned-on by shunting the transistor 20 base current to ground through the collector-to-emitter conduction path of transistor 30.

In a sense, cross-coupled transistors 20 and 30 and resistors 28 and 38 form a signal powered sequence identifying circuit. For example, a first signal, $+V_1$, applied to input terminal 19 turns on transistor 30 and so long as $+V_1$ remains present, it inhibits a subsequent turn-on of transistor 20 by signal $V_2$ later applied to input terminal 49. Conversely, a first signal $+V_2$ applied to input terminal 49 turns on transistor 20 and so long as $+V_2$ remains present, transistor 30 is insensitive to a later applied signal $+V_1$ at input terminal 19.

While the portion of the circuit described thus far uniquely identifies the first to arrive of two input signals by turn-on of an appropriate one of transistors 20 and 30 and inhibiting turn-on of the other, it does not provide a convenient indication of the later to arrive signal since the states of transistors 10 and 20 do not change significantly in response to the later signal. (Of course the later applied signal will result in increased collector saturation voltage level but this change is so slight that its effect upon circuit operation may be neglected for practical purposes). The remainder of the circuit to be described provides separate positive indications of the arrival of two overlapping input signals.

The sequence of signals where input signal $+V_1$ leads input signal $+V_2$ is uniquely identified by the action of transistor 40 and resistor 48. Assume, for example, that input signal $+V_1$ (applied to input terminal 19) starts prior to the concurrent input signal $+V_2$ at input terminal 49. As previously described, transistor 30 will be turned on and transistor 20 will be inhibited from being turned on. Since transistor 30 is on, its collector is close to ground potential, and transistor 40, having its base connected to collector 34 of transistor 30, will be maintained off.

Upon the arrival of signal $+V_2$, transistor 40 remains off so that an output signal appears at output terminal 45 equal to $+V_2$ minus any load current induced voltage drop across resistor 48. Transistor 10, having its base connected in parallel with that of transistor 30, is turned on when transistor 30 is on and maintains output terminal 15 at ground reference level.

Thus, the output signal at terminal 45 indicates both a unique sequence of the two overlapping input signals ($+V_1$ leading $+V_2$ in this example) and the value of the later applied signal ($+V_2$). The output signal at terminal 15 remains unchanged (ground reference level).

Reversing the signal sequence ($+V_2$ leading $+V_1$) results in output terminal 15 producing an output signal representative of $+V_1$ (less any load current induced voltage drop across resistor 18) while output terminal 45 is maintained at ground reference level.

In summary, a positive potential applied to input terminal 19 turns on transistor 30, clamping collector 34 to ground inhibiting turn on of transistor 20. Similarly the positive potential applied to input terminal 49 (in the absence of a positive potential applied to circuit input terminal 19) turns on transistor 20 clamping collector 24 to ground inhibiting turn on of transistor 30 for any subsequently applied value of signal at input terminal 19. Transistors 10 and 40 are each responsive separately to the conductive states of transistors 20 and 30 and to the potential at input terminals 19 and 49, respectively. If transistor 20 is turned on by first arriving signal $V_2$, transistor 10 is maintained off. The overlapping, later arriving signal $V_1$ then causes the potential at output terminal 15 to become substantially equal to $V_1$. On the other hand, if transistor 30 is on by first arriving signal $V_1$, transistor 40 is maintained off and the overlapping later arriving signal $V_2$ causes the potential at output point 45 to become substantially equal to $V_2$.

Figure 2:
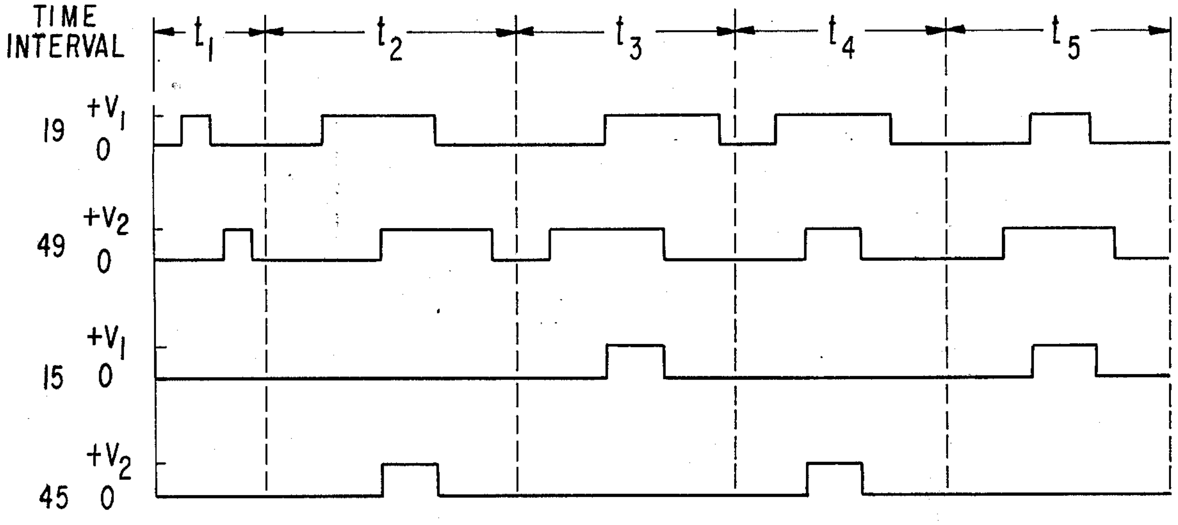
FIGS. 2 and 3 illustrate typical signal waveforms of the circuit of FIG. 1.

The sequential and combinational aspects of the circuit of FIG. 1 are illustrated in more detail in FIG. 2 for a number of combinations of input signals applied to input terminals 19 and 49. Waveforms 19, 49, 15 and 45 correspond to the voltages at circuit points bearing the same designators. Waveforms 19 and 49 have maximum values of $+V_1$ and $+V_2$ volts, respectively and minimum values of zero volts. Although these waveforms are shown as being binary valued, such representation is for the purpose of illustration only. Circuit operation for non-binary values of input signals will be subsequently discussed with regard to other embodiments of the invention. Waveforms 15 and 45 have minimum values of zero volts and maximum values of $+V_1$ and $+V_2$ volts, respectively. Saturation voltage levels of transistors 10 and 40 are neglected in FIG. 2 for clarity, as well as load current induced voltage drops across resistors 18 and 48. Time intervals $t_1$ through $t_5$ represent five possible conditions of the sequence and coincidence of input signals $+V_1$ and $+V_2$ applied to input terminals 19 and 49, respectively.

Time interval $t_1$ illustrates that output terminals 15 and 45 remain substantially at ground potential (zero volts) for non-coincident input signals applied to input terminals 19 and 49.

Time interval $t_2$ illustrates that an output signal ($+V_2$) is produced at output terminal 45 when input signal $+V_2$ is applied subsequent to application of input signal $+V_1$ and that the output signal remains at a level of $+V_2$ only so long as signal $+V_1$ remains continuously applied. In this case signal $+V_1$ terminates prior to termination of signal $+V_2$ thereby truncating the signal ($+V_2$) at output terminal 45. Signal 45 thus represents both a unique sequence ($V_1$ leading $V_2$) and the degree of coincidence ($V_1 \cdot V_2$) of the input signals.

Time interval $t_3$ illustrates a sequence of input signals opposite to that of time interval $t_2$. Here output signal $+V_1$ is produced at output terminal 15 when input signal $V_1$ is applied subsequent to input signal $+V_2$. Output signal 15 remains at a level of $+V_1$ only so long as input signal $+V_2$ remains continuously applied. Here signal $+V_2$ terminates (returns to zero) prior to termination of signal $+V_1$ thereby truncating the latter. For this sequence, no change occurs in output signal 45 and output signal 15 indicates another unique sequence ($V_2$ leading $V_1$) and the degree of coincidence ($V_1 \cdot V_2$) of the input signals.

Time intervals $t_4$ and $t_5$ serve to illustrate that the first signal to return to zero truncates whichever output signal is present at that time.

The waveforms of FIG. 2 thus make clear the ability of the circuit of FIG. 1 to uniquely identify the sequence and measure the coincidence of randomly related (incoherent) input signals which are at least partially coincident. This feature is useful in diverse signal processing applications such as signal detection, cross-correlation, range gating and so on. The waveforms of FIG. 3 illustrate operation of the circuit of FIG. 1 for coherent input signals where, as will be explained, the circuit of FIG. 1 is seen to be capable of unambiguous phase measurement of coherent input signals over a maximum phase range of $2\pi$ radians.

Figure 3:
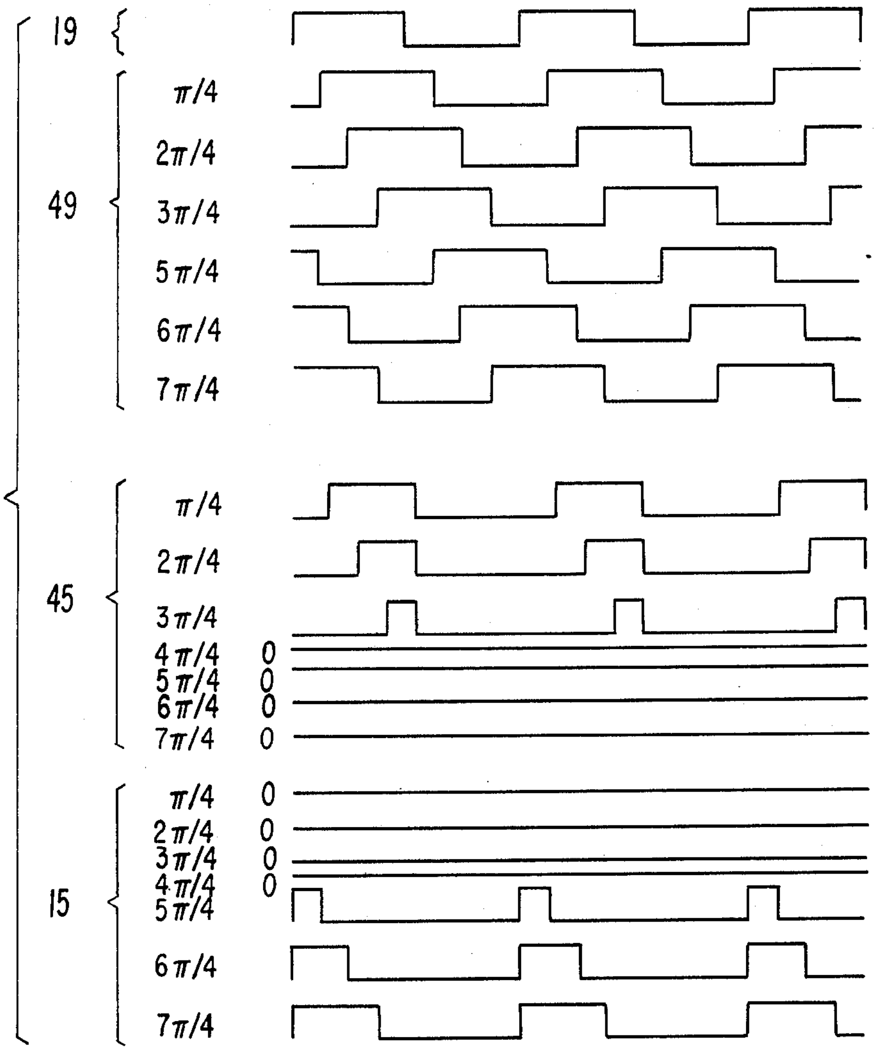

In FIG. 3 waveform 19 corresponds to a periodic input signal applied to input terminal 19 of the circuit of FIG. 1. This signal is taken as a zero phase reference for the remaining signal waveforms. Waveform set 49 represents input signals applied to input terminal 49 having the same period as input signal 19 and various values of phase shift relative thereto ($\pi/4$ - $7\pi/4$ radians). Waveform sets 45 and 15 illustrate the output signals at output terminals 45 and 15, respectively, for each value of phase shift of input signal 49.

Two aspects of the waveform sets of FIG. 3 are particularly significant. The first is that the area under each of the output signal 45 waveforms is a maximum at minimum phase shift and linearly decreases as the phase shift increases becoming zero at $\pi$ radians and remaining zero in the interval $\pi \leq \Phi < 2\pi$. The second is that the area under each of the output signal 15 waveforms is zero in the interval $0 < \Phi \leq \pi$ radians and increases linearly for increasing phase shift thereafter reaching a maximum value at maximum phase shift.

The significance of these aspects is that by performing a definite integration of each of the output signals over at least one period of the input signals, the circuit of FIG. 1 may be employed to unambiguously measure the phase difference of the two input signals over a full range of $2\pi$ radians. Circuits for performing definite integration are generally quite complex. A suitable alternative to definite integration for many applications is to simply smooth the output signals in a suitable energy storage element such as a capacitor. FIGS. 4a and 4b illustrate two ways in which capacitor smoothing of the output signals may be accomplished to implement a signal powered phase measuring instrument according to the present invention.

In FIGS. 4a and 4b the circuit of FIG. 1 is represented by box 52. In FIG. 4a capacitors 54 and 55 are each connected between ground reference point 50 and output terminals 15 and 45. The charging time constant of capacitor 54 is determined by its value of capacity and resistor 18 when input 49 lags input signal 19 in the range between $\pi$ and $2\pi$ radians. This time constant is essentially zero over the phase range between $0 - \pi$ radians because in that range capacitor 54 is essentially shorted to ground by the action of transistor 10 as previously described.

Conversely, the charging time-constant of capacitor 55 is determined by its value of capacity and resistor 48 when input signal 49 lags input signal 19 in the range between 0 and $\pi$ radians. This latter time constant is essentially zero over the range between $\pi$ and $2\pi$ radians because in that range capacitor 55 is essentially shorted to ground by transistor 40. Phase measurement is accomplished in the apparatus of FIG. 4*a* by connecting a suitable measuring instrument, such as a voltmeter across capacitor 54 to measure phase differences in the range between $\pi$ and $2\pi$ radians or connecting the voltmeter across capacitor 55 to measure the phase range between 0 and $\pi$ radians.

The phase measurement apparatus of FIG. 4*b* is similar to that of FIG. 4*a* but requires only a single capacitor 46 connected between output terminals 15 and 45 to provide the smoothing action previously described. The charging time constant of capacitor 56 is determined by its value and the value of resistor 18 in the range between $\pi$ and $2\pi$ radians since output terminal 45 is clamped to ground in that range. Conversely, the charging time constant is determined by capacitor 56 and resistor 48 in the range between 0 and $\pi$ radians since output terminal 15 is clamped to ground in that range. Phase measurement is accomplished by connecting a suitable instrument, such as a voltmeter, across output terminals 15 and 45. Since the relative polarities of the signals produced thereacross differ in each of the two ranges the measuring instrument should have a polarity reversal switch, a rectifier or other means to compensate for the relative polarity reversal. Alternatively the voltage may be measured by a direct current voltmeter having zero referenced at the center of its scale. Of course it will be appreciated that the signal across output terminals 15 and 45 may be differentially amplified by a suitable differential amplifier for increasing the phase resolution of the apparatus.

Embodiments of the invention described thus far have been directed to comparing two electrical input signals. The circuit of FIG. 1 (when implemented with bipolar transistors) is also suitable for comparing an electrical input signal with a non-electrical input signal. This may be accomplished, for example, by directly irradiating transistor 30 with a suitable form of radiation H (such as optical radiation) as illustrated in FIG. 5.

The circuit of FIG. 5 is substantially the same as that of FIG. 1 except that resistors 18 and 28, transistor 10, input terminal 19 and output terminal 15 have been deleted. Additionally a suitable form of radiation $H(t)$ is shown applied directly to transistor 30. The effect of this radiation upon transistor 30 is much the same as that of an electrical signal applied to input terminal 19 of FIG. 1 as previously discussed so that operation of the circuit of FIG. 5 is similar to that of FIG. 1.

In more detail, assume that transistor 30 is a bipolar transistor. It is known that the collector-to-emitter conduction path of a bipolar transistor may be placed in a conductive state by either supplying a current to its base electrode or by direct irradiation of the transistor with a suitable form of energy such as light of a suitable wavelength. It is also known that the transistor may be rendered relatively insensitive to radiation by connecting its base electrode to its emitter electrode by a relatively low impedance path. In other words the radiation sensitivity of a bipolar transistor employed as a phototransistor varies inversely with the value of an impedance connected across its base and emitter electrodes. This characteristic is used to advantage in the circuit of FIG. 5 to inhibit turn-on of transistor 30 when the collector-to-emitter conduction path of transistor 20 is conductive and to enable turn-on of transistor 30 when the collector-to-emitter conduction path of transistor 20 is non-conductive, is illustrated in the following example.

Assume initially that no radiation is applied to transistor 30. Application of a positive potential to input terminal 49 causes a bias current flow through resistor 38 to bases 46 and 26 of transistors 40 and 20, respectively. Transistor 20, thus biased on, clamps base 36 of transistor 30 to ground 50 thereby inhibiting subsequent turn-on of transistor 30 in response to later applied radiation H. Transistor 40, also being biased on, clamps output terminal 45 substantially to the potential of ground reference point 50.

Conversely, application of radiation H to transistor 30, in the absence of a positive potential applied to input terminal 49, places the collector-to-emitter conduction path of transistor 30 in a conductive condition thereby inhibiting turn-on of transistors 20 and 40 and permitting an output signal at output terminal 45 in response to a positive potential subsequently applied to input terminal 49. Thus, circuit operation of FIG. 5 is substantially the same as that described for FIG. 1 where radiation H is analogous to input signal 19.

FIG. 6 (and its associated signal waveforms shown in FIG. 7) illustrates a useful application of the signal comparison circuit of FIG. 5 employed as a "zero voltage detector," in a zero voltage switch. Zero voltage switches are known to be effective in minimizing radio frequency interference and load current surges by switching the load current at or near a zero crossing of the load voltage. Conventionally, zero voltage switches comprise a thyristor controlled switching circuit connected in series with a load and a source of alternating current to be switched. The thyristor is triggered on by a "zero voltage detector" at or near zero crossings of the alternating current signal when enabled by an input control signal. The thyristor remains on until the load current through it decreases to a value less than a minimum "holding" current value (which depends upon the particular thyristor employed). The thyristor then reverts to its "off" condition until triggered on again by a trigger pulse from the zero voltage detector at the next zero crossing of the alternating current signal.

Many forms of zero voltage detectors for controlling the switching thyristor in zero voltage switches are known but they suffer from one or more disadvantages. For example, some prior art zero voltage detectors require an external source of operating voltage necessitating additional switch terminals and complicating switch installation. Other zero voltage detectors employ mechanical relays to achieve circuit isolation and thus suffer from the well known disadvantages of relays generally such as limited operating speed, relatively high cost and bulk, and relatively low reliability. When signal powered optically isolated zero voltage detectors are known, they suffer the disadvantage of producing output pulses of relatively limited duration and amplitude. The disadvantage of this is that since the triggering requirements of thyristors vary from unit to unit and also with changes in operating parameters such as temperature and frequency, unreliable triggering of the thyristor may result (for example, at extremes of temperature, frequency or other operating parameters).

The zero voltage detector of the present invention overcomes the disadvantages of the prior art detectors by providing output pulses the amplitude and width of which are limited principally by the gate firing characteristics of the thyristor to be triggered. Where the gate firing characteristics of the thyristor increase due to a change in parameters, the output pulses of the present zero voltage detector also increase compensating for the higher triggering requirements. This effect is discussed in more detail in the discussion below of the circuit operation of the zero voltage switch of FIG. 6.

The zero voltage switch of FIG. 6 employs the signal comparison circuit of FIG. 5 as a zero voltage detector and additionally includes a light emitting diode 70, a switching thyristor 80 and a full wave bridge rectifier 90. Rectifier 90 is a conventional four diode bridge having two alternating current input terminals 92 and 94, two direct current output terminals 96 and 98 and four diodes 100-103 in the bridge legs poled to produce a positive output voltage at output terminal 98 and a negative output voltage at terminal 96.

Terminal 98 is connected to signal input terminal 49 of the signal comparison circuit previously described and to the anode A of thyristor 80. Terminal 96 is connected to circuit reference terminal 50 of the signal comparison circuit and to cathode K of thyristor 80. Output terminal 45 of the signal comparison circuit is connected to gate G of thyristor 80. Light emitting diode 70 is connected between zero voltage switch control terminals 72 and 74 and is optically coupled to transistor 30 so that upon application of a control signal to input terminals 72 and 74 radiation H produced by diode 70 controls the conductive state of the collector-to-emitter path of transistor 30 in the manner previously described.

In operation, terminals 92 and 94 are connected in series with a load and a source of alternating current power. Rectifier 90 converts the alternating current signal at terminals 92 and 94 to a pulsating direct current signal at terminals 98 and 96. When thyristor 80 is conductive and the potential at terminal 92 is positive with respect to that of terminal 94, load current flows from terminal 92 through diode 102, thyristor 80 and diode 101 to terminal 94. Conversely, when thyristor 80 is conductive and the potential of terminal 94 is positive with respect to that of terminal 92 the load current flows from terminal 94 through diode 103, thyristor 80 and diode 100 to terminal 92. In either case the current flow through thyristor 80 is unidirectional due to the full wave rectification provided by bridge 90 so that thyristor 80 may be a unidirectionally conductive thyristor such as a reverse blocking triode thyristor (SCR). On the other hand, when thyristor 80 is non-conductive (and neglecting current flow through resistors 38 and 48) substantially no load current can flow between terminals 92 and 94.

The conductive state of thyristor 80 is determined by trigger pulses supplied to its gate terminal from output terminal 45 of the signal comparison circuit, the general operation of which has been previously discussed with regard to FIG. 5. Its operation is modified in FIG. 6, however, by the gate triggering characteristics of thyristor 80. In a sense, there is feedback relationship between the signal comparison circuit and thyristor 80 because when thyristor 80 is triggered on, it effectively clamps input terminal 49 to ground reference terminal 50 and conducts a load current between terminals 98 and 96. This interactive relationship between thyristor 80 and the signal comparison circuit of FIG. 6 is illustrated in more detail by the circuit voltage waveforms of FIG. 7.

In FIG. 7 waveform 92 corresponds to the potential of input terminal 92 with respect to that of terminal 94. Waveform 98 represents the potential of terminal 98 relative to that of terminal 96. Waveform H corresponds to radiation produced by light emitting diode 70 (shown as being either on or off). Waveform 45 corresponds to the potential of output terminal 45 relative to that of terminal 96 and has a peak value equal to $V_{th}$ (which corresponds to the threshold trigger voltage of thyristor 80). Waveform $I_{th}$ corresponds to current flow through the anode to cathode path of thyristor 80 and waveform $I_{load}$ corresponds to load current flow between input terminals 92 and 94.

From FIG. 7 it is seen that the alternating current input signal at terminal 92 is converted to a pulsating direct current signal at terminal 98. Where radiation H is off and the potential at terminal 49 is positive, current flow through resistor 38 turns on transistor 40 clamping output terminal 45 to the potential of reference terminal 50 which prevents triggering of thyristor 80. Since thyristor 80 is non-conductive the current through it ($I_{th}$) is zero, therefore the load current between terminals 92 and 94 ($I_{load}$) is also zero.

When a control current is applied to control terminals 72 and 74 light emitting diode 70 produces radiation H which is applied to transistor 30. If the radiation is applied at a time when the potential at terminal 49 is positive, transistor 20 will be conductive which reduces the radiation sensitivity of transistor 30 so that the radiation will have no effect. As soon, however, as the potential at terminal 49 decreases substantially to zero (relative to that of terminal 50) transistor 20 becomes non-conductive so that the radiation sensitivity of transistor 30 increases. If the radiation remains applied, transistor 30 will turn on, clamping bases 26 and 46 of transistors 20 and 40 to the potential of reference terminal 50 preventing subsequent turn on of either of those transistors in response to an increasing potential at terminal 49. Since transistor 40 is held off as the potential at terminal 98 increases, a current will flow through resistor 48 through output terminal 45 to gate G of thyristor 80. This will trigger thyristor 80 to a conductive condition when this potential exceeds the gate trigger voltage of the particular thyristor employed. Once thyristor 80 is conductive, the potential across its anode to cathode path reduces to substantially zero and the bad current is conducted between terminals 92 and 94 of the switch. Thyristor 80 commutates off each time the load current conducted by it reduces to a value less than the minimum holding current level for the particular thyristor employed.

Waveform 45 of FIG. 7 is of particular significance. It illustrates that the maximum amplitude of the output signal produced at output terminal 45 of the signal comparison circuit is limited by the gate trigger threshold voltage of thyristor 80. For example, if the threshold trigger voltage of thyristor 80 increases (due to a change of operating parameters or substitution of a different thyristor) the amplitude of the trigger pulse also increases. Trigger pulses *a* and *b* of waveform 45 illustrate circuit operation when employing a thyristor having relatively sensitive gate firing characteristics while trigger pulse *c* illustrates the pulse waveform when employing a thyristor having less sensitive gate firing characteristics. As is seen, the amplitude and width of the trigger pulses supplied to the thyristor gate terminal are limited by the gate characteristics of thyristor itself so that the zero voltage switch according to the present invention is suitable for use with thyristors having widely varying sensitivities.

The zero voltage switch of FIG. 6 is suitable for use in a variety of general purpose switching applications such as those requiring switching of sinusoidally varying alternating current signals of relatively low frequency. Due to the commutation characteristics of practical thyristors, however, the circuit of FIG. 6 is of only limited usefulness in switching very high frequency alternating signals and is virtually incapable of switching signals having an "ideal" rectangular waveform. The reason for this is that practical thyristors, once triggered on, require a finite length of time after the load current has been reduced substantially to zero in which to commutate off. If a rectangular waveform were applied to input terminals 92 and 94 of the switch in FIG. 6, the length of time during which the load current through thyristor 80 would be near zero would be a function of the rise time and fall time of the input signal waveform. In the limit, for an "ideal" rectangular waveform, this length of time would approach zero. It is thus clear that there are definite limits to the rise time and fall time of the input signal waveform that can be accommodated by the zero voltage switch of FIG. 6.

The zero voltage switch in FIG. 8 overcomes the shortcomings of that of FIG. 6 by employing a pair of switching thyristors arranged to conduct alternate cycles of the load current to be switched. Since each thyristor conducts only a half cycle of the load current, each has a full half period of the input signal waveform in which to commutate off. Thus the commutation time available is always equal to one half period of the input signal waveform, So that the zero voltage switch in FIG. 8 is capable of controlling rectangular as well as sinusoidal signals. It is to be noted, of course, that although the circuit of FIG. 8 successfully commutates off without regard to signal rise times, it is subject to self turn-on for very fast rise time signals. It is an inherent characteristic of thyristors generally that a very rapid rate of increase of anode to cathode potential can induce self turn-on of the thyristor even in the absence of a gate trigger pulse. As is well known in the art, this effect can be minimized by connecting a capacitor and resistor in series across the anode-to-cathode conduction path of the thyristor. Such networks (known as snubber networks) may be employed with the zero voltage switch in FIG. 8 when it is desired to switch signals having rectangular waveforms or signals which otherwise exhibit a rapid rate of change of potential such as those encountered when switching loads having relatively low power factors.

The zero voltage switch of FIG. 8 employs a modified version of the signal comparison circuit of FIG. 5 as a zero voltage detector 100 and additionally includes a pair of diodes 110 and 120, a pair of switching thyristors 130 and 140, and a pair of alternating current input terminals 150 and 160.

Zero voltage detector 100 includes a pair of input terminals 49 and 49' for receiving electrical input signals, a pair of output terminals 45 and 45' for producing output trigger pulses and a circuit reference terminal 50. Diodes 110 and 120 are each connected at their anodes to circuit reference terminal 50 and separately connected at their cathodes to circuit input terminals 160 and 150, respectively. Thyristors 130 and 140 are each connected at their cathodes to circuit point 50 and separately connected to their anodes to circuit input terminals 160 and 150, respectively. Gate terminals 132 and 142 of thyristors 130 and 140, respectively, are connected to output terminals 45 and 45', respectively, of zero voltage detector 100. Input terminals 49 and 49' of zero voltage detector 100 are connected to alternating current input terminals 160 and 150, respectively.

Zero voltage detector 100 is a modified version of the signal comparison circuit of FIG. 5. The modification comprises an additional input terminal 49' for receiving an additional electrical input signal, an additional output terminal 45' for providing an additional output signal, and additional resistor 48' connected between terminals 49' and 45', an additional resistor 38' connected between terminal 49' and collector 34 of transistor 30. And lastly, an additional transistor 40' is connected at its collector 44' and emitter 42' to output terminal 45' and circuit reference terminal 50, respectively. Base 46' of additional transistor 40' is connected to collector 34 of transistor 30.

Before discussing the overall operation of the zero voltage switch of FIG. 8, it is helpful first to consider the detailed operating characteristics of zero voltage detector 100. This detector operates in substantially the same manner as the signal comparison circuit of FIG. 5 but the addition of the elements designated by primed numbers provides an additional signal comparison capability over that afforded by FIG. 5. Specifically, detector 100 has a capability of producing two output signals, each representative of the relative sequence of a separate one of two electrical input signals compared to a third input signal which is in the form of radiation H supplied to transistor 30. The radiation H may be supplied by suitable device such as a light emitting diode, a lamp or other suitable source.

In the following discussion of circuit operation, assume initially that no radiation is supplied to transistor 30. Under this assumption, application of a positive potential to terminal 49 (or terminal 49') causes a current flow through resistor 38 (or 38') which turns on transistors 20, 40 and 40'. Transistor 20 being biased on clamps base 36 of transistor 30 to ground 50 thereby inhibiting subsequent turn on of transistor 30 in response to later applied radiation H. Transistors 40 and 40' being turned on, clamp output terminals 45 and 45', respectively, substantially to the potential of circuit reference terminal 50.

Assume now that radiation H is applied to the conduction path of transistor 30 prior to application of a positive potential to either of terminals 49 or 49'. In this case, transistor 20 is initially off, therefore the radiation sensitivity of transistor 30 is relatively high so that transistor 30 is thus placed in a conductive state. Subsequent application of a positive potential to either or both input terminals 49 and 49', will cause a current to flow through resistor 38 or 38' (or both) to collector 34 of transistor 30. Transistor 30, however, is in a conductive state and inhibits turn on of transistors 20, 40 and 40' by conducting the current supplied to its collector 34 to circuit reference terminal 50. This condition continues for so long as radiation H remains continuously supplied to transistor 30. Since transistors 40 and 40' are off, output terminals 45 and 45' produce output signals in accordance with the potential supplied to input terminals 49 and 49', respectively. The potential of output terminal 45 will be equal to the potential applied to input terminal 49 less the load current induced voltage drop, if any, across resistor 48. Similarly output signal 45' will be equal to the potential applied to input terminal 49' less any load current induced voltage drop across resistor 48'.

The circuit condition described immediately above continues for so long as radiation H remains continuously supplied to the conduction path of transistor 30. If the source of radiation is turned off, at a time when a positive potential is supplied to either of input terminals 49 or 49', the current previously supplied to collector 34 of transistor 30 will be diverted to the bases of transistors 20, 40 and 40' turning them all on inhibiting a subsequent turn on of transistor 30 and clamping output terminals 45 and 45' to the potential of circuit reference terminal 50.

The signal comparison circuit described above (detector 100) is thus seen to produce output signals representative of the order in which a non-electrical signal and either of two electrical signals arrive and the period during which the non-electrical and either of the electrical signals are present. In some applications all three of these signals may be randomly related. In the specific application of FIG. 8, however, electrical signals 49 and 49' are periodic and bear a fixed phase relationship one to another.

Circuit operation of detector 100 for this particular case is illustrated in FIG. 9 where waveforms 49 and 49' correspond to electrical input signals supplied to input terminals 49 and 49' taken with respect to the potential of circuit reference terminal 50. These signals are shown as positive, half wave rectified signals having a phase difference therebetween of 180 electrical degrees. Waveform H, indicated as being either on or off, corresponds to radiation H supplied to the conduction path of transistor 30. Waveforms 45 and 45' correspond to output signals produced at output terminals 45 and 45', respectively, relative to the potential of circuit reference terminal 50.

From FIG. 9 it is seen that a positive output potential is produced at output terminal 45 if, and only if, two conditions are met. The first is that radiation H must be "on" at the time that both input signal 49 and input signal 49' are each substantially at zero volts. The second condition is that radiation H remain on, without interruption when input signal 49 increases to a positive value. As seen, the first condition is met (for output signal 45) at time $t_4$ and the second condition is fulfilled during the interval between $t_4$ and $t_5$.

Similar conditions must be met to produce a positive output signal at output terminal 45'. Radiation H must be "on" at the time that both input signals 49 and 49' are zero and must remain "on" without interruption when input signal 49' increases to a positive value. The first condition is met in the example at time $t_3$ and again at time $t_5$. The second condition is met during the time intervals $t_3 - t_4$ and $t_5 - t_6$. This last case illustrates that termination of radiation H truncates the output signal since the coincidence requirement is not fulfilled beyond time $t_6$.

The overall circuit operation of the zero voltage switch of FIG. 8 is as follows. Input terminals 150 and 160 are connected in series with a load in a source of alternating current. When thyristors 130 and 140 are non-conductive, diodes 110 and 120 function in a sense as half wave rectifiers to produce the half wave rectified signals 49 and 49' previously discussed with regard to FIG. 9. For example, where terminal 150 is positive with respect to terminal 160, diode 120 is reverse biased and diode 110 is forward biased so that the potential at terminal 49' (with respect to terminal 50) is a positive half-wave rectified signal corresponding to waveform 49' in FIG. 9. Conversely, where the potential at terminal 160 is positive with respect to that of 150 diode 110 is reverse biased and diode 120 is forward biased producing the waveform at input terminal 49 corresponding to waveform 49 of FIG. 9.

When radiation H is applied to transistor 30, output terminals 45 and 45' will produce trigger pulses as shown in FIG. 9 to turn on an appropriate ones of thyristors 130 and 140. Once one of these thyristors is triggered, however, circuit operation is modified because, as was assumed, input terminals 150 and 160 are connected in series with a load. If, for example, the potential at 150 is positive with respect to that of 160 and thyristor 140 is triggered on, load current will flow from terminal 150, through the anode-to-cathode conduction path of thyristor 140 and forward biased diode 110 to terminal 160. Since thyristor 140 is on, the potential at input terminal 49' will be substantially equal to that of circuit reference terminal 50. Conversely, when the potential at terminal 160 is positive with respect to that of 150 (and thyristor 130 is triggered) load current flow will proceed from terminal 160 through thyristor 130 and forward biased diode 120 to terminal 150. The potential at terminal 49 in that case will be substantially equal to the potential of circuit reference terminal 50. Thus, turn on of either thyristor terminates the trigger pulse supplied to it. This effect is illustrated more fully in FIG. 10, which shows the overall operating voltage waveforms for the zero voltage switch of FIG. 8.

In the waveforms of FIG. 10, it is assumed that terminals 150 and 160 of the zero voltage switch of FIG. 8 are connected in series with a load and a source of alternating current. Waveform 160 represents a potential of terminal 160 taken with respect to that terminal 150. Waveform H represents radiation H applied to transistor 30. Waveforms 49 and 49' represent the potential of terminals 49 and 49' respectively taken with respect to circuit reference terminal 50. Waveforms 45 and 45' represent trigger pulses produced at output terminals 45 and 45', respectively relative to the potential of circuit reference terminal 50. Waveforms $I_{130}$ and $I_{140}$ represent current flow through thyristors 130 and 140, respectively. The convention employed here is that current flow from the anode to the cathode of each of the thyristors is illustrated as positive current flow. Waveform $I_{load}$ represents load current flow between terminals 150 and 160 where a positive indication represents current flow from terminal 160 to terminal 150 and negative indication represents current flow in the reverse direction.

FIG. 10 illustrates two important operating parameters of the circuit of FIG. 8. The first is that each thyristor conducts only one half cycle of the load current. This is different from the action in zero voltage switch of FIG. 6 where there it was seen that thyristor 80 conducted both half cycles of the load current. The advantage of this is that since each thyristor conducts only half cycle to the load current it has a full half period of the alternating current waveform in which to commutate off. This enables the zero voltage switch in FIG. 8 to switch load voltages having rectangular waveforms which the switch of FIG. 6 is incapable of doing. The second aspect of FIG. 10 of interest is that the trigger pulse width and pulse amplitude is ultimately limited by the gate firing characteristics of thyristors 130 and 140 and not by the output characteristics of the zero voltage detector circuit 100. In other words, detector 100 does not produce fixed amplitude fixed width trigger pulses but instead produces trigger pulses which increase in amplitude and width as input signals 49 and 49' increase so that detector 100 automatically compensates, in a sense for changes in the triggering requirements of thyristors 130 and 140.

Figure 12:
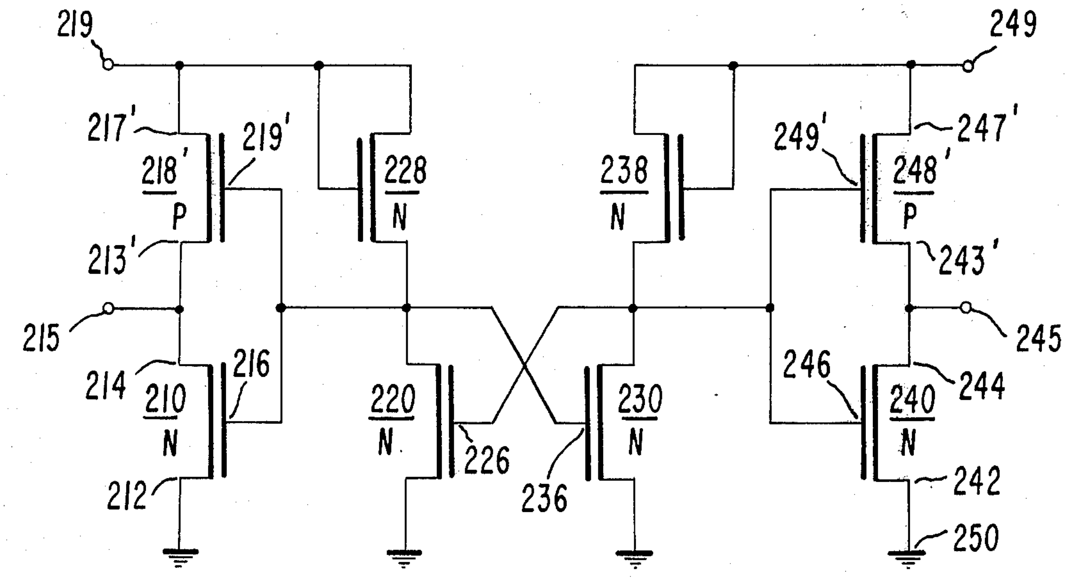

Embodiments of the invention discussed thus far have been illustrated as employing bipolar transistors as switching elements and resistors as means for providing control signals to the switches. FIGS. 11 and 12 illustrate that these functions may be performed by other suitable circuit elements.

The circuit of FIG. 11 corresponds to that previously given in FIG. 1 except that bipolar transistors 10, 20, 30 and 40 are replaced by field effect transistors 210, 220, 230 and 240, respectively and resistors 18, 28, 38 and 48 are replaced by field effect transistors 218, 228, 238 and 248, respectively. Circuit terminals 215, 219, 245, 249 and 250 in FIG. 11 corresponds to terminals 15, 19, 45, 49 and 50 of FIG. 1. In more detail, transistors 210, 220, 230 and 240 are connected at their sources 212, 222, 232 and 242 to ground reference points 250. Drain 214 of transistor 210 is connected to output terminal 215. Drain 224 of transistor 20 is connected to gates 216 and 236 of transistors 210 and 230, respectively. Drain 234 of transistor 230 is connected to gates 226 and 246 of transistors 220 and 240, respectively. Drain 244 of transistor 240 is connected to output terminal 245. Input terminal 219 is connected to drains 213 and 223 and gates 219 and 229 of transistors 218 and 228, respectively. Sources 217 and 227 of transistors 218 and 228, respectively are connected to drains 214 and 224 of transistors 210 and 220, respectively. Input terminal 249 is connected to drains 233 and 243 and gates 239 and 249 of transistors 238 and 248, respectively. Sources 237 and 247 of transistor 238 and 248 are connected to drains 234 and 244 of transistors 230 and 240, respectively.

Operation of the circuit of FIG. 11 is substantially the same as that of the circuit of FIG. 1. Transistors 218, 228, 238 and 248 in FIG. 11 perform the function of resistors 18, 28, 38 and 48, respectively of FIG. 1. Similarly, transistors 210, 220, 230 and 240 function in FIG. 11 as transistors 10, 20, 30, and 40 in FIG. 1. For purposes of the following discussion, assume that each transistor in the FIG. 11 is an enhancement mode N-channel field-effect transistor. In operation, output signals are produced at output terminal 215 and 245 in response to electrical input signals supplied to input terminals 219 and 249 as previously illustrated in FIGS. 2 and 3 with regard to the circuit of FIG. 1. Operation of the circuit of FIG. 11 differs from that of FIG. 1 in that the voltages at drains 224 and 234 of transistors 220 and 230, respectively will be much higher than the corresponding voltages of collectors 24 and 34 of transistors 20 and 30. The reason for this difference is that in FIG. 1 base current supplied, for example, to transistor 20 flows to ground reference terminal 50 through the forward biased base-to-emitter junction of transistor 20. The potential of base 26, therefore, can never be higher than a few hundred millivolts relative to the potential of circuit point 50. In FIG. 11, however, there is no current path between gate 226 and source 222 of transistor 230. Under the same conditions a current flow to gate 226 of transistor 220 is not conducted to source 222, therefore the potential of the gate can increase to a maximum value limited by the potential of the source supplying the current.

This effect is illustrated more fully in the following example. Assume that input terminal 249 is at the potential of ground reference terminal 250 and a positive potential is applied to input terminal 219. Current flow through transistor 228 will increase the potential of gates 216 and 236 of transistors 210 and 230 to nearly the potential applied to input terminal 219. Transistor 230 being biased on, will clamp gates 226 and 246 to the potential of ground reference terminal 250 inhibiting a subsequent turn-on of those transistors by shunting current supplied by transistor 238 to ground 250. A subsequently applied positive potential to input terminal 249 will be conducted by transistor 248 to output terminal 245. Current flow through transistor 238 and transistor 230 to ground terminal 250 will increase the drain potential of transistor 230 to a value determined by the input potential supplied to terminal 249 multiplied by the ratio of the on resistance of transistor 230 divided by the sum of the on resistance of transistor 230 and transistor 238. By making the on resistance of transistor 238 relatively large compared to that of transistor 230 this voltage may be maintained at a value less than the threshold voltage of transistors 240 and 220, thus maintaining those transistors in a non-conductive state notwithstanding the increased potential at drain 234 of transistor 230.

Although the embodiment of FIG. 11 has been illustrated as employing positive operating potentials and N-type transistors, other suitable operating potentials and transistors may be employed instead. For example, the operating potentials may be reversed and the circuit implemented with P-type transistors. In fact, an additional operating advantage may be obtained by employing complementary N and P type transistors as shown, for example, in FIG. 12.

The circuit of FIG. 12 is similar to that of FIG. 11 except that N-type transistors 218 and 248 have been replaced by P-type transistors 218' and 248'. Transistor 218' is connected at its source 217' and drain 213' to terminals 219 and 215, respectively. Gate 219' of transistor 218' is now connected to gate 216 of transistor 210. Transistor 248' is connected at its source 247' and drain 243' to terminals 249 and 245, respectively. Gate 249' of transistor 248' is connected to gate 246 of transistor 240.

Thus connected, transistors 218' and 248' each operate in a common source mode as compared with the source follower mode of operation provided by transistors 218 and 248 in FIG. 11. The advantage of this change is that the circuit of FIG. 12 provides a lower output impedance at output terminals 215 and 245 than that obtainable under similar circumstances with the circuit of FIG. 11.

What is claimed is:

1. In combination:

a circuit reference point;

first, second, third and fourth inverters, each having an input terminal, an output terminal and two power terminals, one power terminal of each inverter being connected to said reference point, the output terminal of the first inverter being connected to the input terminals of the second and third inverters, the output terminal of the third inverter being connected to the input terminals of the first and fourth inverters, the output terminals of the second and fourth inverters for providing circuit output signals;

means for applying a first input signal to the other power terminals of the first and second inverters; and means for applying a second input signal to the other power terminals of the third and fourth inverters.

2. The combination recited in claim 1 wherein each inverter comprises:

at least one transistor having a conduction path and a control electrode for controlling the conductivity of the path, said conduction path being connected between said output terminal and said one power terminal, said control electrode being connected to said input terminal; and impedance means connected between said other power terminal and said output terminal for providing a current path therebetween.

3. The combination recited in claim 2 wherein at least one of said impedance means comprises a resistor.

4. The combination recited in claim 2 wherein said impedance means in at least one of said inverters comprises a field-effect transistor having source, gate, and drain electrodes, the source and gate being connected to said other power terminal and said drain being connected to said output terminal.

5. The combination recited in claim 1 wherein at least one of said inverters comprises a pair of complementary field-effect transistors, each having source, gate, and drain electrodes, their sources being connected to separate ones of said power terminals, their gates being each connected to said input terminal and their drains each being connected to said output terminal.

6. A signal powered switching circuit for producing an output signal representative of an electrical input signal solely during the period that the electrical input signal and a control signal, which already is present when the electrical signal is applied, are both present, the output signal being derived from the electrical input signal, said circuit comprising, in combination:

a common terminal and an output terminal;

a first normally open switch connected between the output terminal and the common terminal;

means for applying the electrical input signal to the output terminal;

7. The combination recited in claim 6 wherein the first, second and third switches comprise, respectively, first, second and third semiconductor devices, each having a conduction path with first and second terminals at the ends thereof and a control electrode for controlling the conduction thereof, the first terminal of each device being connected to the common terminal, the second terminal of the second device being connected to the control electrodes of the first and third devices, the second terminal of the third device being connected to the control electrode of the second device and the second terminal of the third device being connected to the output terminal.

8. The combination recited in claim 7 wherein the means for applying the electrical signal to the first and third switches comprises:

a circuit input terminal for receiving the electrical input signal;

first impedance means connected between the circuit input terminal and the second terminal of the second semiconductor device.

9. The combination recited in claim 7 wherein the semiconductor devices each comprise a common source connected field effect transistor.

10. The combination recited in claim 7 wherein the semiconductor devices each comprise a common emitter connected bipolar transistor.

11. The combination recited in claim 8 wherein the means for applying the control signal to the second switch comprises:

a further circuit input terminal for receiving the control signal; and second impedance means connected between the further circuit input terminal and the control electrode of the second semiconductor device.

12. The combination recited in claim 8 wherein the second semiconductor device is a phototransistor and wherein the means for applying the control signal to the second switch comprises a source for producing radiation in response to the control signal and applying the radiation to the phototransistor for placing the conduction path thereof in a conductive state.

13. A signal powered switching circuit for producing an output signal which varies in accordance with variations of an electrical input signal solely during the period that the electrical input signal and an optical signal, which already is present when the electrical input signal starts, are both present, comprising, in combination:

a common terminal;

first and second transistors and a phototransistor, each having an emitter, a base and a collector, the emitter of each being connected to the common terminal, the collector of the first transistor being connected to the base of the phototransistor, the collector of the phototransistor being connected to the base of each of the first and second transistors;

an input terminal for receiving the electrical input signal;

first impedance means connected between the input terminal and the collector of the phototransistor;

second impedance means connected between the input terminal and the collector of the second transistor;

means for applying the optical input signal to the phototransistor; and an output terminal connected to the collector of the second transistor.

second and third normally open switches;

means coupling the second switch to the first and third switches for inhibiting closure of the first and third switches when the second switch is closed;

means coupling the third switch to the second switch for inhibiting closure of the second switch when the third switch is closed;

means for applying the electrical input signal to the first and third switches to close the first and third switches when the second switch is open; and means for applying the control signal to the second switch to close the second switch when the third switch is open.

14. The combination recited in claim 13 further comprising:

a further input terminal and a further output terminal;

a further transistor having an emitter, a collector and a base connected, respectively, to the common terminal, the further output terminal and the collector of the phototransistor;

third impedance means connected between the further input terminal and the collector of the phototransistor; and fourth impedance means connected between the further input terminal and the collector of the further transistor.

15. The combination recited in claim 13 further comprising:

a thyristor having anode, cathode and gate terminals, said anode terminal being connected to said input terminal, said cathode terminal being connected to said common terminal and said gate terminal being connected to said output terminal for receiving said output signal; and full wave rectifier means for receiving an alternating current input signal, producing a full wave rectified direct current output signal and applying said full wave rectified output signal to said anode and cathode terminals of said thyristor.

16. The combination recited in claim 15 wherein the means for applying the optical input signal to the phototransistor comprises a light emitting diode optically coupled to said phototransistor and responsive to a further electrical input signal for producing light and applying said light to said photoresistor.

17. The combination recited in claim 14 further comprising:

a separate thyristor connected between each of the input terminals and the common terminal, each thyristor being poled in the same sense with respect to the common terminal; and a separate oppositely poled diode connected in parallel with each thyristor.

* * * * *

UNITED STATES PATENT OFFICE

CERTIFICATE OF CORRECTION

PATENT NO. : 3,912,942

DATED : October 14, 1975

INVENTOR(S) : Robert Haynes Isham

It is certified that error appears in the above-identified patent and that said Letters Patent are hereby corrected as shown below:

Col. 6, line 59 "when" should be ---while---
Col. 8, line 51 "bad" should be ---load---
Col. 10, line 5 "to" should be ---at---
Col. 16, delete lines 58 - 67
Col. 16, line 57 "second transistor." is the end of Claim 13.
Col. 17, delete lines 1 - 3.

Claim 6 should be: "A signal powered switching circuit for producing an output signal representative of an electrical input signal solely during the period that the electrical input signal and a control signal, which already is present when the electrical signal is applied, are both present, the output signal being derived from the electrical input signal, said circuit comprising, in combination: a common terminal and an output terminal; a first normally open switch connected between the output terminal and the common terminal; means for applying the electrical input signal to the output terminal; a second and third normally open switches; means coupling the second switch to the first and third switches for inhibiting closure of the first and third switches when the second switch is closed; means coupling the third switch to the second switch for inhibiting closure of the second switch when the third switch is closed; means for applying the electrical input signal to the first and third switches to close the first and third switches when the second switch is open; and means for applying the control signal to the second switch to close the second switch when the third switch is open."

Signed and Sealed this

*twenty-seventh* Day of *January 1976*

[SEAL]

*Attest:*

RUTH C. MASON
*Attesting Officer*

C. MARSHALL DANN
*Commissioner of Patents and Trademarks*